Dec. 25, 1923.
H. W. BENDER
PISTON
Filed June 20, 1921
1,478,368
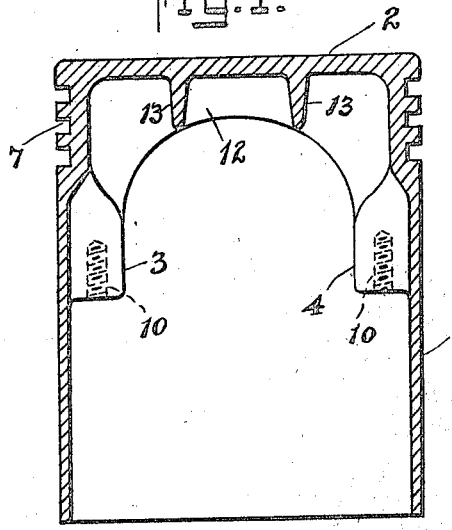
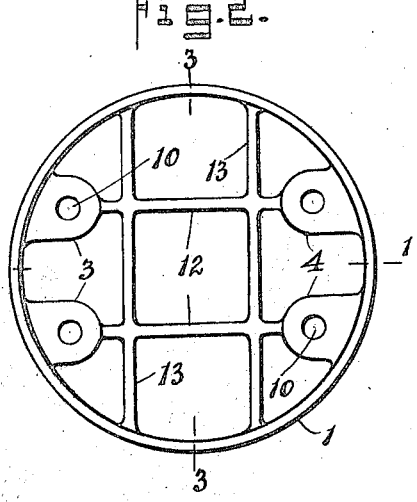
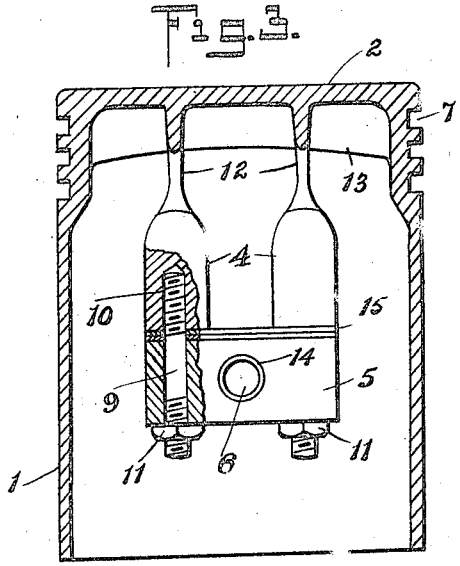
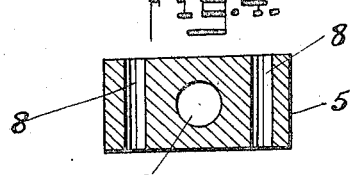
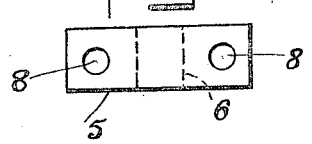
Inventor
HENRY W. BENDER.
By his Attorney
William F. Nickel Patented Dec. 25, 1923.

1,478,368

UNITED STATES PATENT OFFICE.

HENRY W. BENDER, OF BROOKLYN, NEW YORK.

PISTON.

Application filed June 20, 1921. Serial No. 478,957.

*To all whom it may concern:*

Be it known that I, HENRY W. BENDER, a citizen of the United States, residing in Brooklyn, in the county of Kings and State of New York, have invented certain new and useful Improvements in Pistons, of which the following is a specification.

This invention relates to an improvement in pistons; particularly pistons for gas engines and other power units.

An object of this invention is to provide a piston that can be connected to the rod for uniting the piston to the crank shaft of the engine, by a wrist pin or other member which is located entirely within the piston and is completely enclosed thereby; the design of the piston being such that there is no need for drilling or otherwise fashioning a hole transversely through the piston below the top thereof to receive the wrist pin. Hence there is no danger of the wrist pin becoming displaced and projecting to the outside of the piston, and all risk of the pin scoring the inside of the engine cylinder is thus obviated.

Another object of my invention is to provide a piston which can be used for various styles of automobile and similar engines, and be united to the rod of the piston in such a way that the distance between the center of the wrist pin, or other member connecting the piston and piston rod together, and the top or head of the piston, can always be given the proper value; so as to avoid any change in the dimensions of the compression space in the engine; the relative position of the wrist pin inside the piston being made adjustable, for this purpose, in a convenient and practical manner.

A further object of this invention is to provide a piston that can be formed of relatively light and thin material and at the same time have sufficient strength to bear with safety the full force or thrust of the exploding or burning charge of fuel in the working chamber of the cylinder in which the piston moves.

Other objects and advantages of this invention will appear from the following description, taken with the accompanying drawings; which disclose the preferred embodiment of my invention; and the characteristics of the invention will be defined in the appended claims. This disclosure however, is illustrative only, and I may resort to features of construction not actually illustrated herein, but nevertheless within the scope and spirit of the invention, and constituting no departure therefrom, to the full extent indicated by the general meanings of the terms in which the appended claims are expressed.

On the drawings—

Figure 1 is a longitudinal sectional view of a piston according to my invention, the section being on the line 1—1 of Figure 2;

Figure 2 is an elevation thereof, seen from the open end;

Figure 3 is another longitudinal section taken on the line 3—3 of Figure 2;

Figure 4 is a top plan of one of the pillow blocks or bearing elements for securing the piston rod to the piston; and Figure 5 is a longitudinal sectional view of such pillow block or bearing element.

The same numerals indicate the same parts throughout.

The body of the piston is indicated by the numeral 1. It is hollow and of the usual shape, preferably cylindrical, with the bottom or lower end open and the top or upper end 2, closed. In practice, of course, the open lower end is presented to the crank shaft of the engine, and the top 2 to the head of the cylinder containing the piston; and the piston moves in the cylinder so that the top approaches the head of said cylinder and recedes therefrom, as the piston makes its in and out strokes. On the inside of the piston, I provide integral lugs; two of these lugs being located on one side and indicated by the numeral 3; and two on the opposite side, and indicated by the numeral 4. The lugs 3 are the same distance apart on one side of the piston as the lugs 4 on the other, and to those faces of the lugs which are presented towards the open end of the piston 1, I secure pillow blocks or bearing members 5. Two such pillow blocks are used, one to bridge the lugs 3 and the other to bridge the lugs 4; and each of these pillow blocks has an opening or hole 6 through it to receive the wrist pin which unites the piston to the rod, not shown, for connecting the piston to the crank shaft. On the outside of the piston are provided a number of peripheral grooves 7, adjacent the top 2, to receive the usual packing rings which hold the piston tightly in the cylinder containing it. To attach the pillow blocks 5 to the lugs 3 and 4, I provide holes 8 in the pillow blocks at each side of the wrist pin opening 6. Through these holes 8 pass bolts 9, threaded at one end to engage bores 10 in the lugs 3 and 4; and the bolts are also threaded at their opposite ends to receive nuts 11 to force the pillow blocks tight against the engaging faces of the lugs 3 and 4.

Therefore, it will be seen that the wrist pin is located entirely within the piston 1 and is completely enclosed thereby; and no reason exists for boring a hole in the usual manner through the sides of the piston at opposite points to provide bearings for this wrist pin. When a wrist pin is made to engage the piston by means of such a hole in the sides thereof, it often sticks out at one end on one side of the piston, during the operation of the engine, and scores the inside of the cylinder. Much damage is done in this way, and frequently the cylinder that has been subjected to such scoring has to be re-bored inside to render it fit for further service. With my construction all danger of such scoring is removed, because there are no wrist pin holes in the opposite sides of the piston; and consequently the wrist pin cannot move endwise so as to project to the outside of the piston at all. The wrist pin can be held tight or loose in the holes 6 of the pillow blocks or bearing elements 5 secured to the lugs 3 and 4. The holes 6 may extend through the pillow blocks, or if desired only part way into the same; and if the wrist pin is to be made to engage the pillow blocks tightly, any suitable means can be employed to hold its ends firmly in the holes 6.

Each of the lugs 3 is united to the opposite lug 4 by means of a rib 12. The ribs 12 are parallel to each other inside the piston 1, and as indicated in Figure 1, have the form of arches. As the piston can be cast in one piece with the lugs and the ribs, each rib 12 merges into or blends with the lugs 3 and 4 at its opposite ends. These ribs are intersected by another pair of parallel ribs 13 which extend transversely of the ribs 12 and brace these ribs 12. By means of the ribs 12 and 13, the top 2 is reinforced and strengthened and the whole cylinder, including the top 2 and the lateral walls of the piston can be made relatively light, and yet the piston will have sufficient strength to receive and safely transmit the full power of the burning fuel to the piston rod and through the rod to the crank shaft. In other words the thrust, due to the energy of the burning fuel when the piston is working, is exerted only on the ribs and the lugs of the piston; and only the side thrust falls upon the lateral walls of the piston.

The pillow blocks 5 may be provided with bushings or linings 14 for the holes 6 and the distance of these pillow blocks from the top 2 can be varied by the use of shims or liners 15 between the blocks and the engaging faces of the lugs 3 and 4. This feature of the invention is important because there are numerous styles of engines having cylinders of the same bore and therefore pistons of the same diameter, but with varying distances between the top 2 and the center of the wrist pin which engages the rod for connecting the piston and crank shaft together. Hence the centers of the openings 6 in the pillow blocks will often have to be nearer to the top 2 or farther from the top 2 by a distance that may amount to a considerable fraction of an inch or more; and the right distance must be maintained in every case, so that when the head of the piston is at the inner end of its stroke, the distance between the top 2 and head of the cylinder is not changed. Otherwise the degree of compression of the engine will be altered and the operating efficiency for which the engine has been designed will not be secured, but by the use of the elements or liners 15, the right distance between the center of the wrist pin holes 6 and the surface of the top 2 can always be easily secured and an exact fit obtained for any style of engine that is to be used. The piston can therefore be made to serve for various styles of engines having cylinders of the same inside diameter, no matter what may be the distance in such engines between the top of the piston and the axial center of the wrist pin.

The entire piston can be cast in one piece; and from the above description, it will be seen that all the advantages enumerated can be secured by the use of relatively few parts. The piston itself is quite simple in construction and shape and so are the pillow blocks 5 and the screws and nuts to secure the pillow blocks to the lugs 3 and 4; hence the piston can be easily manufactured and is relatively inexpensive to produce.

Of course the piston can be used not only for engines but for pumps also.

The thickness of the walls and top of the piston and of the ribs 12 and 13, as well as the size of the lugs 3 and 4, and their length, measured from the top of the piston towards the opening are matters of design and are determined by the circumstances of each particular case.

Having described my invention, what I believe to be new and desire to secure and protect by Letters Patent of the United States, is:—

1. A hollow piston having internally projecting lugs at diametrically opposite points, a pillow block adjustably secured to the lugs on the inside of said piston at one side thereof, and a pillow block adjustably secured in the piston to the lugs at the other side thereof, whereby the distance of said blocks from the top of the piston can be varied, said blocks having alined openings to receive a wrist pin.

2. A hollow piston having a closed top, reinforcing ribs extending across the inside face of said top on the interior of the piston to strengthen the same, internally projecting lugs carried on the inside of the piston and united with the opposite extremities of each of said ribs, ribs extending transversely of the first ribs across the inner face of said top, a pillow block secured to the lugs at one side of said piston, a pillow block secured to the lugs at the other side of said piston, the pillow blocks having alined openings to receive a wrist pin, and elements between said blocks and said lugs to adjust the distance of said blocks from the top of said piston.

In witness whereof, I have signed my name to this specification, this 11th day of April, 1921.

HENRY W. BENDER.